United States Patent
Durick et al.

(10) Patent No.: US 9,629,005 B2
(45) Date of Patent: Apr. 18, 2017

(54) SYSTEMS AND METHODS PROVIDING ASSISTED AIMING FOR WIRELESS LINKS

(71) Applicants: Travis Durick, Saint Paul, MN (US); Yu Yeung, Hong Kong (HK); Ming Pui Chong, Hong Kong (HK); Alex Wing Hong Chan, Hong Kong (HK)

(72) Inventors: Travis Durick, Saint Paul, MN (US); Yu Yeung, Hong Kong (HK); Ming Pui Chong, Hong Kong (HK); Alex Wing Hong Chan, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/681,078

(22) Filed: Apr. 7, 2015

(65) Prior Publication Data
US 2016/0302083 A1 Oct. 13, 2016

(51) Int. Cl.
*H04B 17/00* (2015.01)
*H04W 24/02* (2009.01)

(52) U.S. Cl.
CPC .................... *H04W 24/02* (2013.01)

(58) Field of Classification Search
CPC .............................. H04W 24/00; H04W 24/02
USPC .............................................. 455/67.11, 67.7
See application file for complete search history.

(56) References Cited

U.S. PATENT DOCUMENTS

| | | | | |
|---|---|---|---|---|
| 6,434,485 B1* | 8/2002 | Beason | ..................... | G01C 5/06 342/120 |
| 9,055,455 B2* | 6/2015 | Durick | ................... | H04W 24/02 |
| 2007/0066233 A1* | 3/2007 | Smith | ....................... | H01Q 3/08 455/67.11 |
| 2011/0298672 A1* | 12/2011 | Otto | ......................... | H01Q 3/08 343/703 |

* cited by examiner

Primary Examiner — Ayodeji Ayotunde (57) ABSTRACT

Systems and methods which provide local sensor and/or external information derived proactive aiming assistance with respect to wireless nodes for facilitating desired wireless links are shown. Embodiments provide an aiming assistance user interface providing guidance with respect to properly altering the orientation of a wireless node to provide a desired wireless link. To facilitate providing aiming assistance embodiments of wireless nodes are adapted to include a plurality of sensors operable to provide information useful in environmental analysis for determining proactive orientation guidance information. Wireless nodes adapted according to embodiments additionally or alternatively utilize information obtained externally useful in determining proactive orientation guidance information. Embodiments of the invention utilize the foregoing sensor information and externally sourced information to determine proactive orientation guidance information.

20 Claims, 5 Drawing Sheets

SYSTEMS AND METHODS PROVIDING ASSISTED AIMING FOR WIRELESS LINKS

RELATED APPLICATION

The present application is a Non-provisional Continuation application which claims the benefits of and is based on Non-provisional application Ser. No. 13/172,228 titled "SYSTEMS AND METHODS PROVIDING ASSISTED AIMING FOR WIRELESS LINKS" filed on 29 Jun. 2011. The contents of the above-referenced application are herein incorporated by reference.

TECHNICAL FIELD

The present invention relates generally to wireless links and, more particularly, to providing assisted aiming for wireless links.

BACKGROUND OF THE INVENTION

The use of wireless links for facilitating various forms of communication, such as voice, multimedia, data, etc., has become nearly ubiquitous in today's world. For example, wireless nodes in the form of base stations and corresponding cellular phones are pervasive and routinely utilized for providing all forms of mobile communication between individuals and groups. Similarly, wireless nodes in the form of access points and wireless terminals (e.g., computers, personal digital assistants (PDAs), game systems, Internet appliances, etc.) are in widespread use for facilitating widespread robust data access and communications.

It is not uncommon that directional antenna beams are used in providing wireless links, whether at either or both ends of a wireless link. For example, as wireless spectrum becomes more and more crowded, the directivity of directional antenna beams may be utilized to avoid or mitigate interfering with other wireless links or being interfered with by the signals of other wireless links. Additionally, gain increases associated with directional antenna beams may be utilized to facilitate increased wireless link distances, to increase signal to noise ratio (SNR), to increase link budget, etc.

The use of such directional antenna beams significantly complicates the deployment and maintenance of wireless links. For example, where non-directional (omni-directional) antenna beams are used, wireless nodes may essentially be placed anywhere within the radius of coverage of an associated wireless node and a communication link can be established. However, when directional antenna beams are used, at least the relative direction of a corresponding wireless node must be determined, and preferably information such as the effective size and shape of the directional antenna beam(s), the topology of the link space, the channel environment, etc. may also be determined, for establishing the wireless link.

Sophisticated installers of wireless nodes implementing directional antenna beams often perform appreciable pre-deployment analysis to determine placement and orientation of wireless nodes (or the antenna systems thereof) to provide desired wireless links. For example, an installer may perform calculations, use map overlays, run site simulations, etc. to analyze the expected channel conditions and wireless link characteristics for particular locations and/or wireless node orientations. From this analysis, the installer may determine a particular wireless node deployment configuration (wireless node location and orientation) and thus deploy wireless nodes in the field to provide wireless links. However, despite this complicated pre-deployment analysis, the results experienced in the field are often not as predicted and thus the resulting wireless links may not have the desired characteristics. For example, the information available to the installer for the pre-deployment analysis is generally not perfect, the wireless nodes may not be deployed in exact correspondence to the plan, etc. Accordingly, such sophisticated installers may nevertheless have to resort to trial and error in deploying wireless nodes to facilitate wireless links.

With the proliferation of various wireless node infrastructure, such as WiFi and WiMAX access points and terminals directed to the consumer market, less and less sophisticated installers are often involved in the deployment of wireless nodes. For example, individuals experienced with deploying cameras and other equipment associated with surveillance systems have recently begun to install camera equipment utilizing wireless links in order to bridge appreciable distances more readily. However, these individuals are typically not specifically trained with respect to the deployment of wireless nodes. Accordingly, such installers neither have the resources nor the skills to do complicated pre-deployment analysis for wireless node deployment.

Some effort has been made to provide information to an installer of a wireless node useful in establishing a wireless link. For example, various forms of signal meters have been utilized to indicate a signal level associated with a current deployment configuration of a wireless node. For example, a simple receive signal strength indicator (RSSI) meter has been included with or coupled to a wireless node to display the signal strength experienced with respect to a current deployment configuration of the wireless node. As another example, an audio tone which alters in pulse periodicity or pitch in correspondence to the signal strength experienced with respect to a current deployment configuration of the wireless node has been utilized. Similarly, an indicator lamp which alters in pulse periodicity in correspondence to the signal strength experienced with respect to a current deployment configuration of the wireless node has also been utilized. In practice, the installer somewhat randomly positions and/or orients the wireless node and continually modifies its orientation (e.g., alters the azimuth angle, elevation angle, location, and/or height) until the particular signal strength indicator being used appears to indicate a highest achievable level. The wireless node is then fixed in place in this deployment configuration for providing wireless links.

Such prior systems, although being relatively inexpensive and easily understood even by unsophisticated installers, provide very little information. That is, these prior systems do not provide any guidance with respect to the proper orientation of the wireless node, but rather provide information with respect to the then current deployment configuration. For example, these prior systems provide no information with respect to the relative position of a corresponding wireless node and thus the installer must initially select a wireless node deployment configuration without the aid of information from the signal level system. Moreover, it is up to the installer to determine what action to take (e.g., end the orientation phase of the deployment or alter the orientation and, if so, what change or changes to the orientation to make) with respect to the wireless node deployment activity.

BRIEF SUMMARY OF THE INVENTION

The present invention is directed to systems and methods which provide local sensor and/or external information derived proactive aiming assistance with respect to wireless nodes for facilitating desired wireless links. Embodiments of the invention provide an aiming assistance user interface providing guidance with respect to properly altering the orientation of a wireless node to provide a desired wireless link. Such proactive guidance may, for example, comprise instruction to provide reorientation in a particular azimuth direction, to provide reorientation in a particular elevation direction, and to provide no further reorientation.

In order to provide aiming assistance as described herein, embodiments of wireless nodes are adapted to include a plurality of sensors operable to provide information useful in environmental analysis for determining proactive orientation guidance information. For example, embodiments of a wireless node adapted according the concepts herein may comprise sensors for determining geographic location, azimuth orientation, elevation orientation, height, and/or orientation relative to one or more corresponding wireless node.

Wireless nodes adapted according to embodiments of the invention additionally or alternatively utilize information obtained externally useful in determining proactive orientation guidance information. For example, embodiments of a wireless node adapted according to the concepts herein may obtain information from one or more external source regarding the location of other wireless nodes, from which the current location of the wireless node may be determined, from which the current orientation of the wireless node may be determined, etc.

Embodiments of the invention utilize the foregoing sensor information and externally sourced information (collectively referred to as deployment information) to determine proactive orientation guidance information. For example, processing may be performed with respect to all or some portion of the deployment information to determine one or more putative deployment configurations for the wireless node which should result in a wireless link having at least one desired characteristic. A wireless node orientation guidance user interface of embodiments provides the determined proactive orientation guidance information to an installer in real-time to provide proactive aiming assistance with respect to the wireless node for facilitating desired wireless links. Processing may be performed with respect to available deployment information (e.g., to utilized updated sensor information) for providing the real-time proactive aiming assistance.

In operation according to embodiments of the invention, proactive orientation guidance information may be provided for a plurality of deployment configurations for a particular wireless node. For example, a putative "best" deployment configuration may be determined and proactive orientation guidance information provided for an installer to orient the wireless node in this putative best deployment configuration. Analysis of a resulting wireless link may indicate that a putative "next best" deployment configuration should be analyzed to determine if the resulting wireless link more closely meets one or more desired characteristic. Accordingly, proactive orientation guidance information may again be provided for an installer to orient the wireless node in this putative next best deployment configuration, followed by analysis of a resulting wireless link. Such iterations of proactive orientation guidance may be repeated until a resulting wireless link suitably meets one or more desired characteristic or is otherwise determined to be a best deployment configuration for the wireless node.

Embodiments of the invention may operate to provide proactive orientation guidance information at time other than initial deployment of a wireless node. For example, sensor information and/or externally sourced information may be monitored after deployment to determine if there may be a change suggesting a yet better deployment configuration than the deployment configuration presently in use. A user may be notified that a new putative best deployment configuration may be available and thus proactive orientation guidance information may again be provided for reorienting the wireless node.

Information regarding a wireless node, such as sensor information collected during a deployment phase and/or during operation of the wireless node, information regarding a final deployment configuration of the wireless node, etc., may be provided to external systems for use thereby. For example, information regarding the final deployment configuration of the wireless node and information regarding various interference sources detected by the wireless node may be provided to an external server which provides radio map and other information utilized by wireless nodes for deployment configuration determinations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
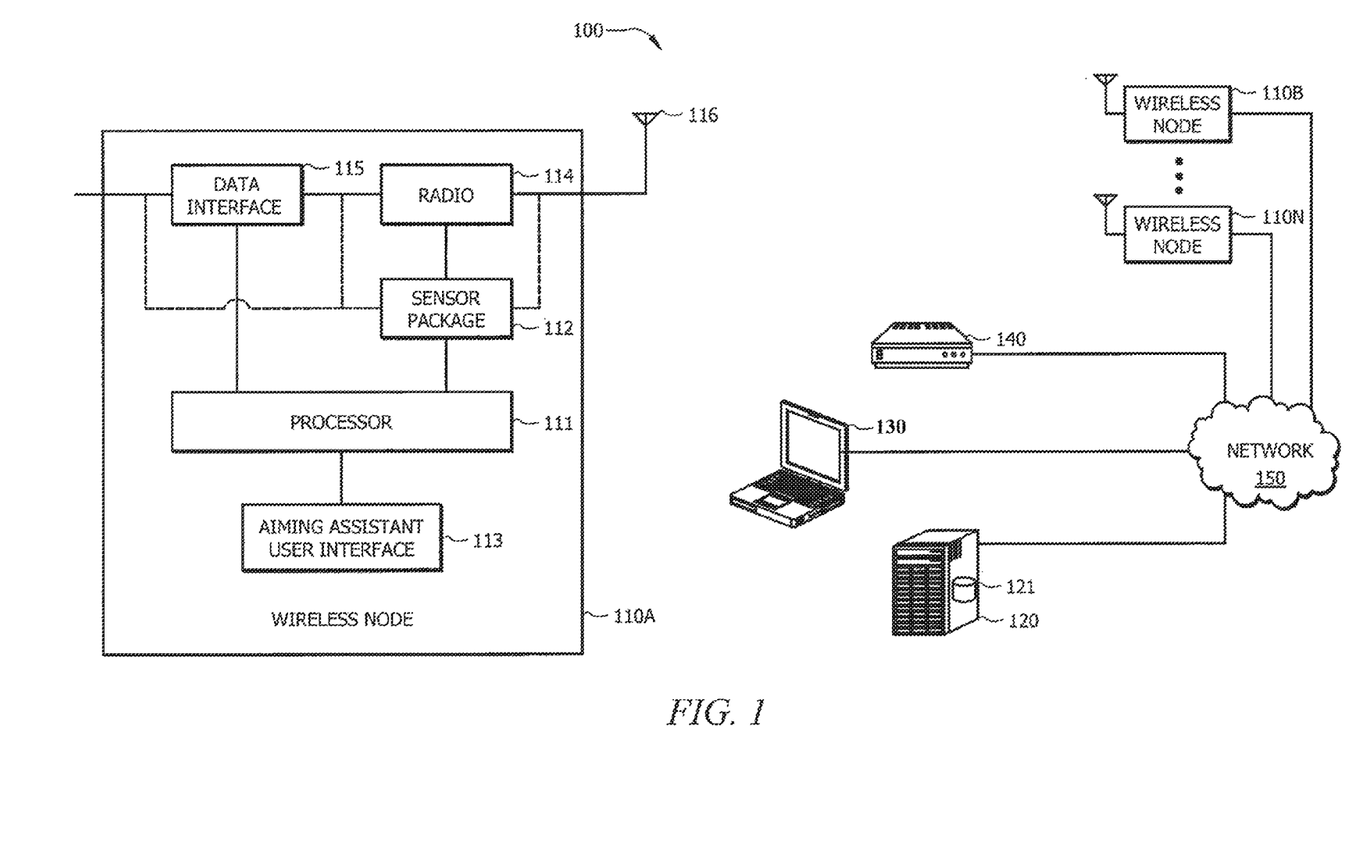
FIG. 1 shows a system adapted to provide proactive aiming assistance according to embodiments of the invention.

FIG. 1 shows system 100 adapted according to embodiments of the invention to provide proactive aiming assistance with respect to wireless nodes for facilitating desired wireless links. System 100 of the illustrated embodiment comprises a plurality of wireless nodes (shown here as wireless nodes 100A-100N) which may be utilized in providing desired wireless links. For example, wireless nodes 100B and 100N may be deployed as master nodes (e.g., wireless access points, base stations, service provider equipment, etc.) whereas wireless node 100A may be deployed as a slave node (e.g., wireless terminal, subscriber equipment, etc.). A wireless link providing a desired level of reliability, throughput, signal to noise characteristics, etc. may be desired to be established between wireless node 100A and one or more of wireless nodes 100B and 100N, such as to provide connectivity to network 150 (e.g., the Internet, a local area network (LAN), a metropolitan area network (MAN), a wide area network (WAN), the public switched telephone network (PSTN), a cable subscriber network, and/or the like). Accordingly, in normal operation one or more devices or systems may be coupled to wireless node 110A for connectivity to network 150.

Embodiments are described herein with reference to wireless node 100A providing a slave node configuration and wireless nodes 100B and 100N providing master nodes coupled to a network in order to provide a more concrete example for aiding in understanding the concepts of the present invention. However, it should be appreciated that the concepts of the present invention are not limited to application to such wireless node configurations. For example, wireless node 100A may provide a connection to a network while wireless nodes 100B and 100N provide connections to various devices or systems. In some embodiments, none of wireless nodes 100A-100N may be connected to a network, such as where point to point communication between particular devices is desired. Correspondingly, in other embodiments each of wireless nodes 100A-100N may be connected to networks, such as where bridging of networks is desired. Thus, one of ordinary skill in the art will appreciate that the particular functionality provided by wireless nodes in their operation is immaterial to the proactive aiming assistance of embodiments herein.

As can be seen in the embodiment illustrated in FIG. 1, wireless node 100A includes radio unit 114 coupled to antenna system 116 and data interface 115 providing a radio communication interface. For example, data interface 115 provides one or more ports, such as a network port (e.g., Ethernet port, personal area network (e.g., BLUETOOTH) port), a universal serial bus (USB) port, a proprietary bus, and/or the like, for communicatively connecting wireless node 110A to various devices and systems. Antenna system 116, such as may comprise one or more aerials, patches, horns, or other antenna elements and associated feed network (e.g., feed lines, meanders, beam forming networks, baluns, etc.) operates to provide one or more radiation pattern (e.g., a narrow, directional antenna beam) for transmitting and/or receiving radio frequency (RF) signals. Correspondingly, radio unit 114 provides modulation and/or demodulation between baseband and RF signals communicated between antenna system 116 and data interface 115. Accordingly, radio unit 114, antenna system 116, and data interface 115 cooperate to provide communication between one or more device or system coupled to data interface 115 and other remote devices or systems using a wireless link facilitated by radio unit 114 and antenna system 116.

In addition to radio unit 114, antenna system 116, and data interface 115, wireless node 110A of the illustrated embodiment includes processor 111, sensor package 112, and aiming assistance user interface 113. These functional blocks of the illustrated embodiment cooperate to provide proactive aiming assistance of embodiments of the present invention.

Sensor package 112 includes one or more sensor providing information to processor 111 for use in providing proactive aiming assistance to a user through aiming assistance user interface 113. For example, sensor package 112 of embodiments comprises a global positioning system (GPS) receiver (e.g., integrated circuit GPS receiver module), a barometric pressure sensor (e.g., static pressure sensor), a temperature sensor (e.g., silicon bandgap temperature sensor, resistance thermometer, coulomb blockade thermometer, etc.), an inclinometer (e.g., liquid capacitive, electrolytic, etc. tilt sensor), a tilt switch (e.g., mercury tilt switch), an accelerometer (e.g., 3-axis solid state accelerometer), gyroscopic sensor (e.g., Coriolis vibratory gyroscope), a digital compass (e.g., magnetometer), a signal receive strength sensor, a signal to noise sensor, and/or the like providing corresponding sensor information to processor 111.

It should be appreciated that sensors of sensor package 112 need not be provided exclusively for use in proactive aiming assistance operation. For example, a GPS receiver module utilized as part of sensor package 112 of an embodiment may also be utilized for other purposes, such as to provide GPS derived timing of a communication protocol supported by wireless node 110A.

Processor 111 may comprise a general purpose processor (e.g., a processor from the PENTIUM family of processors available from Intel Corporation), a special purpose processor (e.g., an application specific integrated circuit (ASIC)), or combinations thereof, operable under control of an instruction set (e.g., software and/or firmware) defining operation as described herein. Processor 111 may have supporting circuitry associated therewith (not shown), such as memory (e.g., random access memory (RAM), read only memory (ROM), disk memory, optical memory, etc.), a co-processor (e.g., math co-processor), etc. In operation according to embodiments of the invention, processor 111 utilizes information obtained from one or more sensors of sensor package 112 and/or obtained from external sources (e.g., through data interface 115) to determine a configuration orientation for wireless node 110A. For example, externally sourced information useful with the aforementioned sensor information for determining a configuration orientation may be obtained from database 121 stored by server 120, such as through coupling wireless node 110A to an appropriate network host (e.g., computer 130 or broadband modem 140) via data interface 115 or using a wireless link (e.g., using data interface 115, radio unit 114, and antenna system 116).

Aiming assistance user interface 113 of embodiments is operable to provide guidance to a user for positioning wireless mode 110A in the configuration orientation determined by processor 111. For example, signals provided by processor 111 may be utilized at aiming assistance user interface 113 to provide guidance with respect to properly altering the orientation of wireless node 110A. Such proactive guidance may, for example, comprise instruction to provide reorientation in a particular azimuth direction, to provide reorientation in a particular elevation direction, and to provide no further reorientation. Accordingly, aiming assistance user interface 113 of embodiments comprises various outputs to communicate guidance information to a user. Additionally, aiming assistance user interface 113 may comprise various inputs to accept control input and/or responses from a user.

Figure 2:
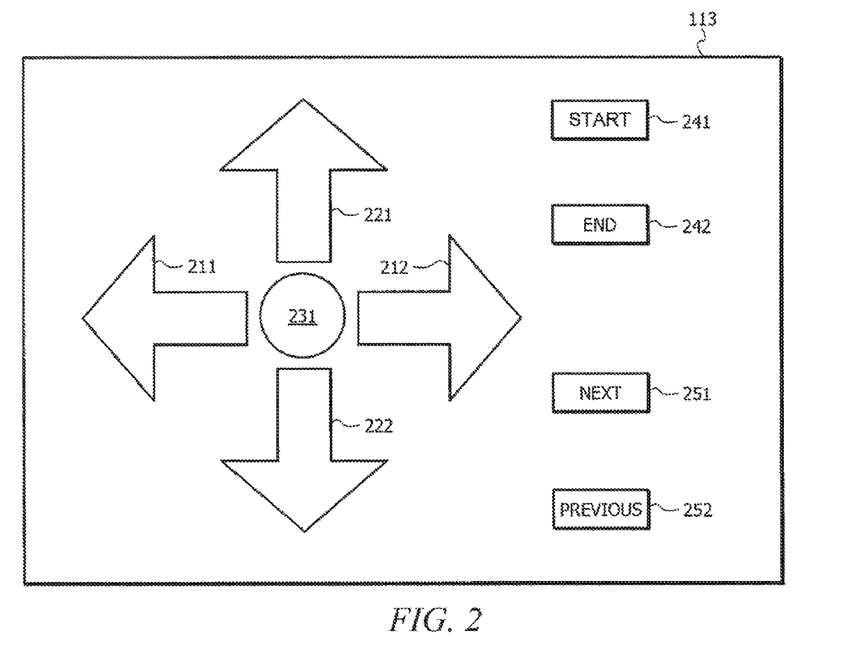
FIG. 2 shows an aiming assistance user interface according to embodiments of the invention.

FIG. 2 shows an exemplary embodiment of input/output provided by aiming assistance user interface 113. The embodiment of aiming assistance user interface 113 illustrated in FIG. 2 includes azimuth guidance outputs 211 and 212, elevation guidance outputs 221 and 222, and hold guidance output 231. The illustrated embodiment of aiming assistance user interface further includes guidance control inputs 241 and 242 and guidance response inputs 251 and 252. Guidance outputs 211, 212, 221, and 222 may comprise light emitting diodes (LEDs) while guidance control inputs 241 and 242 and guidance response inputs 251 and 252 may comprise pushbutton switch surfaces according to embodiments. Embodiments of the invention, however, may comprise any number of configurations of user interface, such as may include liquid crystal displays (LCDs), touch screens, digital pointing devices, keyboards, etc.

The various inputs and outputs provided by aiming assistance user interface 113 cooperate to provide proactive aiming assistance guidance to a user. For example, a user may indicate a desire to receive proactive aiming assistance by manipulating input 241 (e.g., a "Start" button). Thereafter, as will be better understood by the operational description which follows, appropriate ones of outputs 211, 212, 221, 222, and 231 may be activated to guide the user in reorienting wireless node 110A. In accordance to embodiments of the invention, outputs 211 and 212 comprise azimuth guidance outputs and thus an appropriate one thereof is activated to guide a user in reorienting wireless node 110A in the azimuth (e.g., output 211 is activated for guiding left rotation and output 212 is activated for guiding right rotation), outputs 221 and 222 comprise elevation guidance outputs (e.g., output 221 is activated for guiding down-tilt and output 222 is activated for guiding up-tilt), and output 231 comprises hold guidance output (e.g., output 231 is activated for guiding a hold to further reorientation). By activating an appropriate one or more of outputs 211, 212, 221, 222, and 231 throughout a user reorienting wireless node 110A, the user may be guided to orient the wireless node in a desired deployment configuration. It should be understood that embodiments of the invention may activate multiple outputs simultaneously (e.g., rotation and tilt) to provide complex guidance information. Upon reaching the desired deployment configuration, output 231 may be activated to indicate "hold". Thereafter, the user may indicate having been satisfied and desiring no further proactive aiming assistance by manipulating input 242 (e.g., an "End" button).

Outputs of aiming assistance user interface 113 of the embodiment illustrated in FIG. 2 is not limited to binary guidance information (e.g., activation of an output or inactivation of an output). For example, more robust guidance may be provided using techniques such as flashing or pulsing an output at different rates to indicate an amount of reorientation to be provided (e.g., rapidly flashing output 211 may indicate appreciable rotation to the left is desired while slowly flashing output 211 may indicate that the wireless node is nearing the desired orientation). Robust guidance may be provided through activation of multiple outputs simultaneously, the use of coded sequences of activation, etc. For example, where a wireless node is initially deployed in a location which is not compatible with establishing a desired wireless link (e.g., an obscured view of all other wireless nodes), each of outputs 211, 212, 221, and 222 may be activated simultaneously (e.g., all flashed simultaneously) to indicate that wireless node 110A should be repositioned.

It should be appreciated that aiming assistance user interface 113 of the illustrated embodiment is not limited to directing the user to a single deployment configuration of wireless node 110A. For example, a plurality of different deployment configurations may provide desired wireless links, and aiming assistance user interface 113 may be utilized to guide a user to reorient wireless node 110A to several such deployment configurations (e.g., for determining which deployment configuration provides a "best" deployment configuration). Accordingly, outputs 211, 212, 221, 222, and 231 may be operated to guide the user to orient wireless node 110A in each such deployment configuration, if desired. For example, after having oriented wireless node 110A in a particular deployment configuration, perhaps remaining in the deployment configuration for a sufficient period of time to analyze an established wireless link, the user may then indicate a desire to reorient the wireless link in another deployment configuration by manipulating an appropriate one of inputs 251 and 252 (e.g., selecting either a "Next" deployment configuration or a "Previous" deployment configuration).

Embodiments of aiming assistance user interface 113 may comprise input/output in addition to or in the alternative to that shown in the embodiment of FIG. 2. For example, embodiments of aiming assistance user interface 113 may include a display screen, a touch screen, various indicators, a digital pointer, audio input, audio output, etc.

It should be appreciated that, although exemplary embodiments have been described above wherein processor 111, sensor package 112, and aiming assistance user interface 113 are included as part of a wireless node, embodiments may be configured differently than illustrated. For example, some or all of the functionality provided by the foregoing embodiments of processor 111, sensor package 112, and/or aiming assistance user interface 113 may be provided external or separate from the wireless node. According to an embodiment some of the functionality provided by processor 111, sensor package 112, and/or aiming assistance user interface 113 is disposed in an external module removable coupled to wireless node 110A. Such an external module configuration may facilitate providing proactive aiming assistance as described herein using a wireless node not specifically configured for such operation, using a less expensive or less robust wireless node, using a same external module for a plurality of wireless nodes, etc.

Embodiments of the foregoing external module configuration may be communicatively coupled to wireless node 110A for providing operation as described herein using an interface of data interface 115 (e.g., a network interface, a USB interface, a proprietary interface, etc.), using a wireless link provided by radio 114 and antenna 116, and/or the like. Functional blocks of the external module may cooperate with functional blocks of the wireless node for providing proactive aiming assistance. For example, sensors of both an external module and the wireless node may be utilized for providing aiming assistance. Similarly, a processor of the external module and the wireless node may cooperate in determining proactive orientation guidance information for aiming assistance. As another example, the input and/or output provided by aiming assistance user interface 113 may be provided in an external module for use with a wireless node.

It should be appreciated that embodiments of an external module as may be used for providing proactive aiming assistance may implement various configurations. For example, embodiments may implement a configuration in which the external module is specifically designed for use in providing proactive aiming assistance for wireless nodes. Alternatively, embodiments may implement a general purpose device operable (e.g., operating under control of an instruction set defining operation as described herein) as an external module providing proactive aiming assistance for wireless nodes. For example, a smart phone (e.g., IPHONE available from Apple Computer Inc. or ANDROID based phone available from manufacturers such as Motorola Inc.) may execute an application for interfacing with a wireless node (e.g., via WiFi or BLUETOOTH) and providing display of output and/or accepting input of aiming assistance user interface 113.

Although details with respect to an embodiment of wireless node 110A have been discussed above, it should be appreciated that other wireless nodes of system 100 may be similarly configured. For example, one or more of wireless nodes 110B-110N may be adapted as shown for wireless node 110A in FIGS. 1 and 2. Accordingly, such configurations of wireless nodes 110B-110N may be provided proactive aiming assistance during deployment and/or thereafter according to embodiments of the invention, if desired. Additionally or alternatively, deployment information regarding the deployment configuration of one or more of wireless nodes 110B-110N may be provided to server 120 for storage in database 121 using a configuration of functional blocks as described above with respect to wireless node 110A. Thus, although the wireless nodes may be configured to provide different operating functionality (e.g., slave node functionality, master node functionality, etc.), any or all such wireless nodes may advantageously implement functional aspects of a proactive aiming assistance architecture herein.

Figure 3:
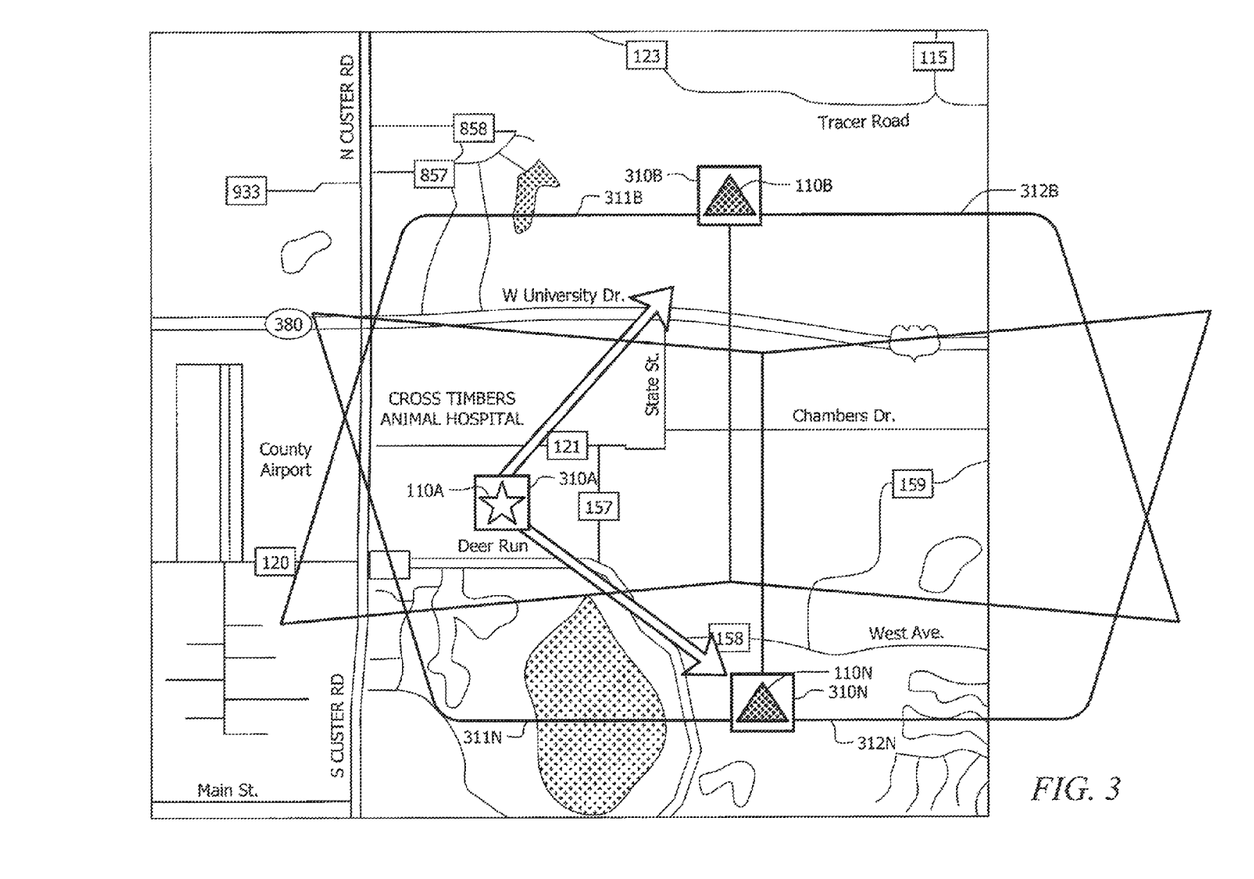
FIG. 3 shows an exemplary deployment of wireless nodes using proactive aiming assistance according to embodiments of the invention.

Continuing with the example that wireless node 110A is configured to provide operation as a slave node and wireless nodes 110B and 110N are configured to provide operation as master nodes, assume that it is desired to deploy wireless node 110A for facilitating a broadband wireless link to a particular site, such as location 310A shown in FIG. 3. For example, it may be desired to deploy wireless node 110A to provide a broadband Internet connection to location 310A, such as for coupling one or more computer (e.g., a computer such as computer 130) disposed at location 310A to the Internet, for coupling a LAN (not shown) at location 310A to the Internet (e.g., via a modem such as broadband modem 140), etc. Assume further that wireless nodes 110B and 110N have been deployed at respective sites, shown as locations 310B and 310N in FIG. 3, to provide radio coverage for broadband wireless links to network 150. Accordingly, wireless node 310B, as deployed in the illustrated configuration, provides radio coverage in service areas associated with 90° antenna beam 311B and 90° antenna beam 312B. Similarly, wireless node 310N, as deployed in the illustrated configuration, provides radio coverage in service areas associated with 90° antenna beam 311N and 90° antenna beam 312N.

Location 310A of wireless node 110A is disposed within the service areas of antenna beam 311B provided by wireless node 110B and antenna beam 311N provided by wireless node 110N. Assuming antenna system 116 (FIG. 1) of wireless node 110A provides directional radio coverage (e.g., a narrow, directional antenna beam such as a 30° antenna beam) various orientations of wireless node 110A may be able to establish a wireless link with wireless node 110B or wireless node 110N. Particular orientations of wireless node 110A may provide suitable wireless links (e.g., appropriately face a corresponding wireless node), perhaps with a subset of those orientations (e.g., one or two orientations) providing wireless links having one or more superior or "best" characteristics. Operation of proactive aiming assistance provided according to embodiments of the invention, a user is guided through orienting wireless node 110A to establish a desired wireless link with a corresponding wireless node, such as wireless node 110B or wireless node 110N.

Figure 4:
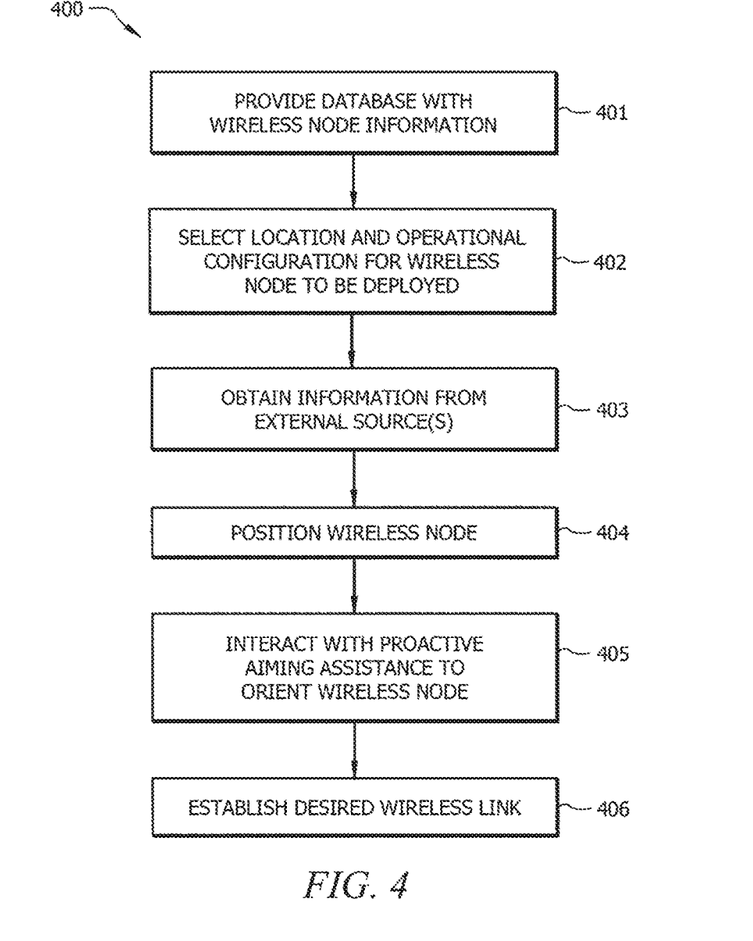
FIG. 4 shows a high level flow diagram of operation of proactive aiming assistance provided according to embodiments of the invention.

Directing attention to FIG. 4, flow 400 shown therein illustrates operation of proactive aiming assistance provided according to embodiments of the invention. At block 401 of the illustrated embodiment one or more database, such as database 121 of FIG. 1, is provided with wireless node information for facilitating proactive aiming assistance. For example, a database may be provided with information regarding the operational configuration of wireless nodes (e.g., master node, slave node, public node, private node, resources provided, etc.), information regarding the communication attributes of wireless nodes (e.g., protocols supported, antenna beam width (e.g., horizontal width and/or vertical width), antenna beam shape, antenna gain, radio output power, radio receive sensitivity, etc.), information regarding the geographic location of wireless nodes (e.g., physical address, latitude and longitude, GPS coordinates, etc.), information regarding the orientation of wireless nodes (e.g., height (e.g., above ground level (AGL) and/or mean sea level (MSL)), vertical alignment, up tilt/down tilt, azimuth facing angle, etc.), information regarding the environmental conditions (e.g., disposed on roof top, disposed indoors, location of possible obstructions, subject to shadowing by deciduous vegetation, high interference environment, etc.), and/or other information as may be utilized in determining suitable pairings of wireless nodes for providing desired wireless links.

It should be appreciated that, although an embodiment is described above with respect to the use of database 121 for storing wireless node information, operation in accordance with the concepts of the present invention are not limited to use of such a configuration. For example, various nodes, such as wireless nodes 110B-110N, may themselves store such wireless node information (or some portion thereof). In operation according to embodiments of the invention such nodes may share wireless node information and/or other information, such as via an ad-hock or peer-to-peer technique.

The foregoing wireless node information may be provided by operator input, collected by automated means, provided by the wireless nodes themselves, and/or combinations thereof. According to embodiments of the invention, wireless nodes such as wireless nodes 110B and 110N of FIG. 3 utilize sensors associated therewith (e.g., using sensor package 112 and processor 111 of FIG. 1) to collect and/or derive wireless node information provided at block 401. Such information may be supplemented, refined, etc. through operator input, if desired.

At block 402 of the illustrated embodiment a location and operational configuration for a wireless node to be deployed is selected. For example, a general location, such as a location of a home or business for which a wireless link is desired, may be selected. The deployment location may be indicated using information such as physical address, latitude and longitude, GPS coordinates, etc. An operational configuration for the wireless node, such as to indicate the wireless node will be operated as a master or slave node, to select communication protocols to be utilized, to select resources to be made available by or to the wireless node, etc., is also selected. For example, wireless device 110A (the wireless device to be deployed) may be coupled to a host system (e.g., computer 130) for selection or input of the foregoing location and operational configuration. Additionally or alternatively, location and/or operational configuration may be provided directly to wireless device 110A, such as through manipulation of input features of aiming assistance user interface 113 or other user interface thereof.

At block 403 of the illustrated embodiment information useful in providing proactive aiming assistance is obtained from a source external to the wireless node to be deployed. For example, some or all of the aforementioned wireless node information (block 401) may be obtained. According to an embodiment of the invention, the location for deployment of the wireless node (block 402) may be utilized to identify a subset of other wireless nodes (e.g., wireless nodes 110B and 110N of FIG. 3) as potential candidates for establishing the desired wireless link. For example, processor 111 may operate to utilize the information regarding the selected location and information available from database 121 to identify a subset of wireless nodes (e.g., wireless nodes disposed within a threshold distance from the location, wireless nodes having particular configurations, wireless nodes having particular resources, etc.) as candidates for establishing wireless links. Wireless node information for a subset of wireless nodes may be obtained for use in proactive aiming assistance. For example, wireless node 110A may be temporarily provided network connectivity (e.g., using computer 130, modem 140, etc.) or otherwise provided access to database 121 for obtaining wireless node information for an appropriate set of wireless nodes.

It should be appreciated from the foregoing that wireless node 110A may be temporarily coupled to a host device for facilitating the selection of operational configuration and location (block 402) and obtaining information from an external source. For example, wireless node 110A may be temporarily coupled to computer 130, which itself is coupled to network 150, as part of the deployment process of the illustrated embodiment of flow 400.

At block 404 of the illustrated embodiment the wireless node is initially positioned for the deployment. For example, wireless node 110A may be disposed on a rooftop, on an antenna mast, disposed in an appropriate window of a building at location 301A, etc. The position of wireless node 110A is an initial position from which proactive aiming assistance herein will guide a user to orient wireless node 110A in a deployment configuration for establishing a desired wireless link. Accordingly, this initial position need not be precise or even directed to another wireless node (e.g., wireless node 110B or wireless node 110N).

It should be appreciated that particular positions of wireless node 110A may be incompatible with establishing a suitable wireless link with particular other wireless nodes (e.g., one or the other of wireless nodes 110B and 110N). For example, a particular position, although at location 310A, may result in structure disposed between wireless node 110A and one or more of the available other wireless nodes. Similarly, a particular position at location 310A may result in wireless node 110A being disposed outside of (horizontally and/or vertically) the service area of one or more of the available other wireless nodes. Accordingly, embodiments of the invention may operate to provide proactive assistance with respect to the initial positioning of wireless node 110A.

In operation according to an embodiment of the invention, processor 111 or another processor (e.g., a processor of computer 130) may determine proactive site guidance information for use in initially positioning wireless node 110A (block 404). For example, having information regarding a location selected for deployment of wireless node 110A (block 402) and information regarding other wireless nodes (block 403), embodiments of the invention may perform analysis to determine a general position (e.g., rooftop, above a threshold height, having a particular exposure, such as a southerly exposure, tilted generally up/down, etc.) for wireless node 110A from which proactive aiming assistance is to be provided. Such site guidance information may be provided to the user through an interface of wireless node 110A (e.g., through aiming assistance user interface 113, such as through blinking codes or displaying messages upon an output thereof) or of another device (e.g., through a screen of computer 130, such as may be utilized in obtaining the aforementioned information from external sources).

At block 405 of the illustrated embodiment proactive orientation guidance information is determined and communicated to the user through the aiming assistance user interface for orienting the wireless node in a deployment configuration determined to provide a wireless link with one or more of the wireless nodes. For example, as discussed in detail with respect to the flow of FIG. 5, processor 111 may determine a putative deployment configuration for wireless node 110A which should result in a wireless link having at least one desired characteristic. Thereafter, processor 111 may utilize the determined putative deployment configuration information and information provided by sensor package 112, radio unit 114, and/or data interface 115 to provide appropriate signals to aiming assistance user interface 113 to guide the user in manipulating wireless node 110A to achieve the deployment configuration.

At block 406 of the illustrated embodiment, once a suitable deployment configuration has been achieved, the orientation of wireless node 110A may be fixed (e.g., through tightening fasteners, attaching clamps, applying adhesive, etc.), whether permanently or semi-permanently, and a wireless link having desired characteristics established with one or more other wireless node (e.g., wireless node 110B and/or 110N).

Figure 5:
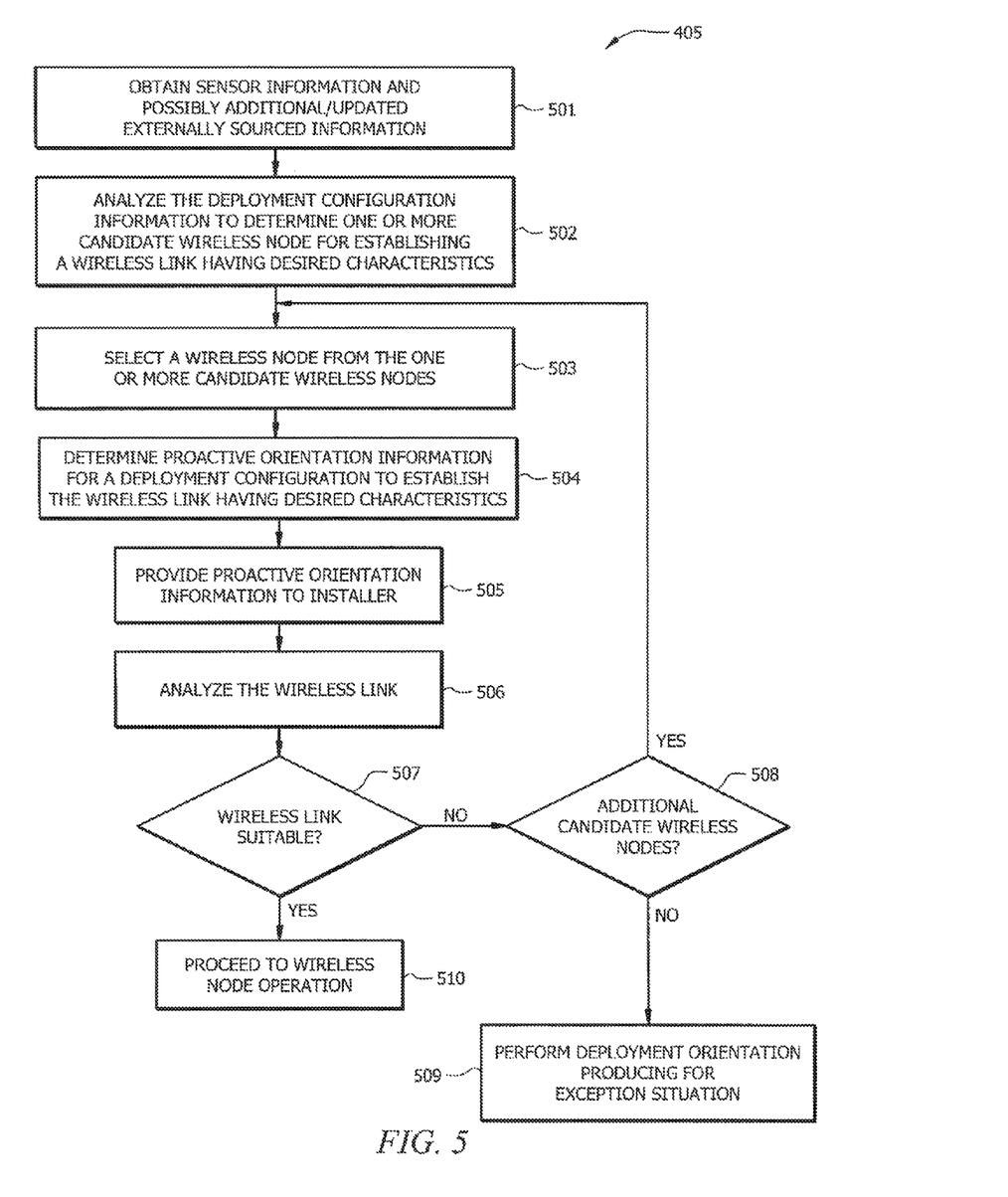
FIG. 5 shows an embodiment of a flow diagram providing detail with respect to interaction with proactive aiming assistance to orient a wireless node shown in FIG. 4.

FIG. 5 provides detail with respect to a flow as may be provided by operation of block 405 of FIG. 4 for proactive aiming assistance to orient a wireless node. In operation according to an embodiment of the invention, the user may have initially positioned wireless node 110A (block 404) and indicated that proactive aiming assistance is desired, such as by manipulating aiming assistance user interface 113 input 241 (e.g., "Start").

At block 501 of the illustrated embodiment sensor information is obtained providing information regarding the environment in which the wireless node is positioned. For example, one or more sensor of sensor package 112 may provide information regarding the precise location of wireless node 110A (e.g., GPS sensor derived location information), a height of wireless node 110A (e.g., barometric pressure derived height information), a facing direction of wireless node 110A (e.g., compass derived direction information), tilt of wireless node 110A (e.g., inclinometer derived tilt information), and/or the like.

The above mentioned sensor information may be utilized by processor 111 in determining a present deployment configuration of wireless node 110A (e.g., precisely where the wireless node is located, how the wireless node is facing azimuthally, how the wireless node is facing elevationally, the height of the wireless node, etc.). It should be appreciated, however, that such sensor information may not directly provide information from which a present deployment configuration of wireless node 110A may be determined. For example, although the barometric pressure information from a barometric pressure sensor, as may be included as part of sensor package 112, provides information from which height information may be derived, the barometric pressure information may not itself directly provide such height information. That is, although barometric pressure decreases as a known rate with height, the local ambient barometric pressure is affected by weather systems (e.g., high pressure cells, low pressure cells, cold temperature cells, warm temperature cells, etc.) such that a particular barometric pressure reading needs to be corrected for local conditions (e.g., temperature and pressure) for determination of height.

Accordingly, operation in accordance with embodiments of block 501 of the illustrated embodiment obtains externally sourced information (e.g., in addition to, or updates to, externally sourced information obtained at block 403 of FIG. 4). In operation according to embodiments, processor 111 accesses one or more external data sources available through network 150 for such additional or updated externally sourced information. For example, continuing with the foregoing barometric pressure example, processor 111 may access aviation weather databases available via the Internet to obtain current temperature and barometric pressure readings for one or more sites (e.g., airports) near the location at which wireless node 110A is being deployed.

It should be appreciated that the externally sourced information described above as being obtained at block 501 of the illustrated embodiment may be obtained elsewhere in the flow. For example, where wireless node 110A is not provided Internet connectivity during deployment, such information may be obtained prior to positioning the wireless node (e.g., at block 403 when other externally sourced information is obtained).

At block 502 of the illustrated embodiment one or more candidate wireless node for establishing a wireless link having desired characteristics is identified. In operation at block 502 according to embodiments, the current deployment configuration information (e.g., orientation and/or site information) for the wireless node is determined by processor 111. The determined current deployment information and/or other information (e.g., sensor information) is analyzed by processor 111 of embodiments to determine candidate wireless nodes of the aforementioned subset of wireless nodes (e.g., wireless nodes 110B and 110N of FIG. 3) suitable for establishing a wireless link. For example, current deployment configuration information may indicate that wireless node 110A is disposed upon a north face of a building and thus has an obscured view to the south. Therefore, particular wireless nodes (e.g., wireless node 110N of FIG. 3) of the subset of wireless nodes previously determined to otherwise be within range of wireless node 110A, but which are disposed to the south thereof, may be omitted from consideration as candidate wireless nodes. Accordingly, particular wireless nodes (e.g., wireless node 110B of FIG. 3) of the previously determined subset of wireless nodes which are located to the north may be identified as candidate wireless nodes.

The analysis of candidate wireless nodes provided according to embodiments at block 502 may comprise analysis in addition to identifying candidate wireless nodes for providing a wireless link with wireless node 110A when disposed at its present location. For example, processor 111 may provide analysis such that the candidate wireless nodes identified are organized into a hierarchy of preference, such as a "best" candidate (e.g., wireless node 110B), a "next-best" candidate (e.g., wireless node 110N), and so on. Such a preference hierarchy may be based upon various factors, such as relative distance, topology between the candidate wireless node and the present location of wireless node 110A, differences in height between the candidate wireless node and wireless node 110A, configuration of the candidate wireless node, calculation of the predicted link budget between the candidate wireless node and wireless node 110A, an attribute of the deployment configuration of wireless node 110A when a wireless link is established with the candidate wireless node, and/or the like. In operation according to a preferred embodiment of the invention one or more predicted wireless link quality attribute is computed (e.g., using predicted link budget calculations and calculations to determine if wireless node 110A and the candidate wireless node are positioned to fall within the Fresnel zone of the corresponding antenna beam) and used in determining a preference hierarchy of candidate wireless nodes for establishing a wireless link with wireless node 110A.

At block 503 of the illustrated embodiment a candidate wireless node is selected for orienting wireless node 110A to establish a wireless link. For example, a "best" candidate wireless node (e.g., wireless node 110B) from the preference hierarchy of candidate wireless nodes may be selected.

At block 504 of the illustrated embodiment proactive orientation information is determined for a deployment configuration of the wireless node to establish a wireless link with the selected candidate wireless node. For example, using the determined current deployment configuration information (block 502) and the wireless node information obtained (block 403) with respect to the selected candidate wireless node may be analyzed by processor 111 to determine a desired deployment configuration of wireless node 110A for establishing a wireless link between wireless node 110A and the selected candidate wireless node (e.g., wireless node 110B). Knowing the determined desired deployment configuration for the selected candidate wireless node and the determined current deployment configuration for wireless node 110A (block 502), proactive orientation information (e.g., guidance for tilting up, tilting down, rotating left, rotating right, etc.) for guiding a user in reorienting wireless node 110A may be determined.

At block 505 of the illustrated embodiment proactive orientation information is provided to the user to guide the user in orienting the wireless node in the determined desired deployment configuration. For example, aiming assistance user interface 113 outputs 211, 212, 221, 222, and/or 231 may be controlled to guide the user in orienting wireless node 110A into a deployment configuration for establishing a wireless link with the selected candidate wireless node (e.g., wireless node 110B). According to an embodiment of the invention, outputs 211 and 212 comprise azimuth guidance outputs and thus an appropriate one thereof is activated to guide a user in reorienting wireless node 110A in the azimuth (e.g., output 211 is activated for guiding left rotation and output 212 is activated for guiding right rotation), outputs 221 and 222 comprise elevation guidance outputs (e.g., output 221 is activated for guiding down-tilt and output 222 is activated for guiding up-tilt), and output 231 comprises hold guidance output (e.g., output 231 is activated for guiding a hold to further reorientation).

It should be appreciated that the providing of proactive orientation information is not limited to the use of aiming assistance user interface 113 according to embodiments of the invention. For example, a port of data interface 115 may additionally or alternatively be utilized to provide proactive orientation information to a user. In operation according to an embodiment of the invention, a processor-based system (e.g., computer 130, a smart phone, a PDA, etc.) may be placed in communication with wireless node 110A (e.g., using a USB port, an Ethernet port, a WiFi port, a BLUETOOTH port, etc. of data interface 115) to receive proactive orientation information from wireless node 110A and to present information to the user. The presentation of proactive orientation information by such a processor-based system may be robust, such as to provide a graphical representation of wireless node 110A and the selected candidate wireless node, to provide an image overlay upon a map or satellite image, to provide audio instructions to the user, etc.

In providing proactive orientation information at block 505, embodiments of the invention operate to obtain updated sensor information and/or other information for use in providing proactive aiming assistance guidance to a user. Using such updated sensor information, processor 111 of embodiments may activate appropriate one or more of outputs 211, 212, 221, 222, and 231 (FIG. 1) throughout a user reorienting wireless node 110A, and thus the user may be guided to orient the wireless node in a desired deployment configuration. For example, as an azimuth angle changes, as indicated by a digital compass (e.g., magnetometer) of sensor package 112, processor 111 may determine that more, less, or no further rotation of wireless node 110A is desired and activate/inactivate appropriate ones of outputs 211 and 212 of aiming assistance user interface 113. Similarly, using such updated sensor information, processor 111 of embodiments may determine that wireless node 110A has been oriented in the determined desired deployment configuration and thus activate output 231 to indicate further reorientation should be halted. For example, information from one or more sensors of sensor package 112 may be analyzed to determine that wireless node 110A is in the determined desired deployment configuration. Additionally or alternatively, other available information, such as data provided by data interface 115 may be utilized to determine that wireless node 110A is in the determined desired deployment configuration (e.g., data received by radio unit 114 may be analyzed to determine wireless node 110A is properly oriented to communicate with another wireless node such as wireless node 110B).

At block 506 of the illustrated embodiment wireless communications are analyzed to determine if a wireless link having desired attributes has been established. For example, data provided by data interface 115 (e.g., received through antenna system 116, radio unit 114, and data interface 115) may be analyzed by processor 111 to determine if data is being received from another wireless node. Likewise, data may be communicated by processor 111 using data interface 115, radio unit 114, and antenna system 116 for receipt by another wireless node. Such communications may be utilized to analyze the quality of the wireless link established between wireless node 110A and another wireless node (e.g., wireless node 110B).

Additionally or alternatively, sensor information may be utilized at block 506 to determine if a wireless link having desired attributes has been established. For example, receive signal strength information, signal to noise information, link budget information, etc., as may be determined by processor 111 from sensor information provided by sensor package 112, may be analyzed for determining the quality of the wireless link established between wireless node 110A and another wireless node.

Information regarding the quality of the resulting wireless link may be analyzed to determine if the wireless link provides a desired wireless link. For example, one or more attribute of the wireless link may be analyzed to determine if the one or more attribute is within a threshold amount of a desired value selected for the attribute. Embodiments of the invention may compare one or more attribute of the established wireless link to a set of wireless link target attributes (e.g., obtained at block 403 and/or block 501) and/or to one or more predicted wireless link quality attribute (e.g., computed at block 502) to determine if the established wireless link has desired attributes.

It should be appreciated that the wireless node information and other information from which predicted wireless link attributes are calculated may not be perfect and, thus, the attributes of the established wireless link may not match those of the predicted wireless link attributes. Accordingly, analysis of a plurality of wireless links, and thus a plurality of deployment configurations for wireless node 110A, may be desired. Thus, the embodiment of flow 405 illustrated in FIG. 5 includes blocks 507 and 508 providing for repeating of providing proactive aiming assistance guidance for a plurality of candidate wireless nodes.

At block 507 of the illustrated embodiment a determination is made as to whether the established wireless link is suitable. For example, processor 111 may determine if the established wireless link has attributes sufficiently meeting those desired. If it is determined that the established wireless link is not suitable, processing according to the illustrated embodiment proceeds to block 508. For example, output 231 of aiming assistance user interface 113 may be flashed to indicate that additional reorientation is desired to analyze other wireless links. When ready to proceed with further proactive aiming assistance guidance the user may manipulate an input of aiming assistance user interface 113, such as input 251 (e.g., "Next" button).

At block 508 of the illustrated embodiment a determination is made as to whether additional candidate wireless nodes remain to be analyzed. That is, a determination is made according to embodiments as to whether additional candidate wireless nodes remain for which a suitable wireless link may be established. If it is determined that additional candidate wireless nodes remain to be analyzed, processing according to the illustrated embodiment proceeds to block 503. At block 503 of the illustrated embodiment another candidate wireless node is selected for orienting wireless node 110A to establish a wireless link. For example, a "next best" candidate wireless node (e.g., wireless node 110N) from the preference hierarchy of candidate wireless nodes may be selected and proactive aiming assistance guidance provided for establishing a wireless link therewith. If, however, it is determined at block 508 that no additional candidate wireless nodes remain to be analyzed, processing according to the illustrated embodiment proceeds to block 509.

At block 509 of the illustrated embodiment exception situation deployment orientation processing is performed. For example, one or more output of aiming assistance user interface 113 may indicate to the user that wireless node 110A should be repositioned (e.g., moved from inside a building to outside the building, raised or lowered in height, disposed in a position which is not shadowed in a particular direction, etc.). In operation according to embodiments of the invention, outputs 211, 212, 221, 222, and 231 may be flashed simultaneously to indicate an exception situation. The user may thus be informed that the present position is unsuitable. The user may then seek further information, such as by coupling wireless node 110A to a host (e.g., computer 130) for providing more detailed information for resolving the exception situation.

If, at block 507, it is determined that the established wireless link has attributes sufficiently meeting those desired, processing according to the illustrated embodiment proceeds to block 510. At block 510 of the illustrate embodiment reorientation of wireless node 110A is halted and wireless node 110A is placed in an operational configuration. For example, processor 111 may indicate that a suitable wireless link has been established using the current deployment configuration by continuous activation of output 231 of aiming assistance user interface 113. The user may indicate a desire to place wireless node 110A in an operational mode by manipulation of an input of aiming assistance user interface 113, such as input 242 (e.g., "End" button). Thereafter, devices or systems coupled to wireless node 110A (e.g., through one or more port of data interface 115) may utilize the established wireless link for communication.

Embodiments of the invention may provide functionality at block 510 in addition to or in the alternative to placing wireless node 110A in an operational state. For example, embodiments may operate to report deployment configuration information of the wireless node, communication environment information (e.g., as measured by sensors of sensor package 112), etc. to one or more external system (e.g., server 120 for storage in database 121). Such information may be utilized to facilitate improved proactive aiming assistance in further operations with respect to wireless node 110A and/or other wireless nodes deployed in system 100.

Although the foregoing example has been described with reference to deploying wireless node 110A, proactive aiming assistance provided according to embodiments of the present invention may be provided at times other than initial deployment. For example, proactive aiming assistance as set forth above may be performed post-deployment, such as after a significant change in topology or morphology, appearance of new interferers, deployment of new candidate wireless nodes, etc. In operation according to an embodiment of the invention, processor 111 may periodically access wireless node information (e.g., as may be stored in database 121) to determine if one or more new candidate wireless node has been deployed. If it is determined that such a candidate wireless node is present, proactive aiming assistance ma be suggested (e.g., though an output of aiming assistance user interface 113, through providing a signal to another system via data interface 115, etc.).

It should be appreciated that, although flow 400 of FIG. 4 and flow 405 of FIG. 5 show functions performed in an exemplary order, the order of performing various of the above described functions may be altered as desired or appropriate. For example, certain calculations or determinations may be performed prior to positioning the wireless node (block 404 of FIG. 4), such as to offload some or all of this processing to another system (e.g., computer 130), to access network data or resources where the wireless node is not provided network connectivity during reorientation, etc. As another example, processing to determine candidate wireless nodes may be performed to embodiments of the invention prior to obtaining sensor information (block 501 of FIG. 5), such as to perform processing to identify candidate wireless nodes at block 402 of FIG. 4.

The functional blocks operable to facilitate proactive aiming assistance according to embodiments of the invention may be operated to provide additional or alternative functionality, if desired. For example, processor 111 and sensor package 112 may operate at times other than deployment or reorientation of wireless node 110A to provide communication environment analysis, to determine if the orientation of wireless node 110A has changed, etc. In operation according to an embodiment of the invention processor 111 and sensor package 112 may periodically operate to collect signal information and/or other information for providing to an external system (e.g., server 120) for various uses, such as communication environment analysis, wireless link quality modeling, determining positions of other (e.g., non-cooperating) wireless nodes, and/or the like. For example, such information provided by a plurality of similarly configured wireless nodes may be utilized with trilateration or triangulation techniques for determining the positions of various interferers in the wireless environment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for updating information at a database, performed at a server, wherein the information is used for providing proactive aiming assistance guidance information at a wireless node for orienting the wireless node, comprising the steps of:
   a. obtaining sensor information from a wireless node;
   b. sending a list of candidate wireless nodes to the wireless node;
   c. receiving a first information of a selected first candidate wireless node from the wireless node;
   d. determining a radio map corresponding to the wireless node for deployment configuration determinations;
   e. performing communication environment analysis, wireless link quality modeling;
   f. determining positions of interferers in a wireless environment;
   g. sending a second information based on steps (d), (e) and (f) to the wireless node;
   h. receiving a third information regarding final deployment configuration of the wireless node and information regarding various interference sources detected by the wireless node from the wireless node;
   i. updating the database based on the third information received in step (h);
   j. wherein the wireless node uses the second information received from the server for:
      (i) determining proactive aiming assistance guidance information with respect to the first candidate wireless node;
      (ii) providing proactive aiming assistance guidance information for reorientation;
      (iii) presenting the proactive aiming assistance guidance information at an aiming assistance user interface of the wireless node;
      (iii) determining values of wireless link attributes;
      (iv) when the values of wireless link attributes are not satisfactory, prompting the user to perform steps (i)-(ii) with another candidate wireless node;

(v) when the values of wireless link attributes are satisfactory, prompting the user to stop the reorientation;

wherein the proactive aiming assistance guidance information includes a rotation direction and a tilt direction;

wherein the rotation direction corresponds to a direction to rotate the wireless node to orient the wireless node into the desired deployment configuration; and wherein the tilt direction corresponds to a direction to tilt the wireless node to orient the wireless node into the desired deployment configuration.

2. The method of claim 1, wherein the aiming assistance user interface comprises at least one indicator associated with tilt direction and at least one indicator associated with rotation direction;

wherein the proactive aiming assistance guidance information indicates the amount of rotation to be provided in the rotation direction by selectively flashing the at least one indicator associated with rotation direction; and wherein the proactive aiming assistance guidance information indicates the amount of tilt to be provided by selectively flashing the at least one indicator associated with tilt direction.

3. The method of claim 1, further comprising: receiving providing sensor information from the wireless node when orientation of the wireless node has changed.

4. The method of claim 1, wherein step (j)(v) is performed by activating a hold guidance output of the aiming assistance user interface of the wireless node.

5. The method of claim 1, wherein the wireless node assigns a preference hierarchy to candidate wireless nodes listed in the list of candidate wireless nodes after receiving the list of candidate wireless nodes and selects the first candidate wireless node according to the preference hierarchy.

6. The method of claim 5, wherein the preference hierarchy is assigned according to at least one of relative distance, topology, configuration of the candidate wireless nodes, and calculation of predicted link budget.

7. The method of claim 1, wherein the wireless node further performs the steps of:

monitoring a wireless link established with the first candidate wireless node;

determining whether or not the current orientation is suitable; and wherein when the wireless node determines that the current orientation is not suitable, indicating at the aiming assistance user interface that reorientation of the wireless node should be performed.

8. The method of claim 7, wherein the wireless node further providing proactive aiming assistance guidance information for performing reorientation of the wireless node.

9. The method of claim 1, wherein the wireless node further performs the steps of:

periodically determining whether one or more new candidate wireless nodes have been deployed; and when one or more new candidate wireless nodes have been deployed, providing proactive aiming assistance guidance information with respect to the one or more new candidate wireless nodes.

10. The method of claim 1, further comprising utilizing the sensor information for determining positions of interferers in a wireless environment of the wireless node after performing step (a).

11. A system comprising a server and a wireless node, wherein the server comprising:

at least one first processor;

at least one first storage medium for storing program instructions executable by the at least one first processor for updating information at a database, performed at a server, wherein the information is used for providing proactive aiming assistance guidance information at a wireless node for orienting the wireless node, comprising the steps of:

a. obtaining sensor information from a wireless node;

b. sending a list of candidate wireless nodes to the wireless node;

c. receiving a first information of a selected first candidate wireless node from the wireless node;

d. determining a radio map corresponding to the wireless node for deployment configuration determinations;

e. performing communication environment analysis, wireless link quality modeling;

f. determining positions of interferers in a wireless environment;

g. sending a second information based on steps (d), (e) and (f) to the wireless node;

h. receiving a third information regarding final deployment configuration of the wireless node and information regarding various interference sources detected by the wireless node from the wireless node;

i. updating the database based on the third information received in step (h);

j. wherein the wireless node comprises an antenna, a plurality of sensors, an aiming assistance user interface, at least one second processor; and at least one second storage medium for storing program instructions executable by the at least one second processor for using the second information received from the server for:

(i) determining proactive aiming assistance guidance information with respect to the first candidate wireless node;

(ii) providing proactive aiming assistance guidance information for reorientation;

(iii) presenting the proactive aiming assistance guidance information at an aiming assistance user interface, of the wireless node;

(iii) determining values of wireless link attributes;

(iv) when the values of wireless link attributes are not satisfactory, prompting the user to perform steps (i)-(ii) with another candidate wireless node;

(v) when the values of wireless link attributes are satisfactory, prompting the user to stop the reorientation;

wherein the proactive aiming assistance guidance information includes a rotation direction and a tilt direction;

wherein the rotation direction corresponds to a direction to rotate the wireless node to orient the wireless node into the desired deployment configuration; and wherein the tilt direction corresponds to a direction to tilt the wireless node to orient the wireless node into the desired deployment configuration.

12. The system of claim 11, wherein the aiming assistance user interface comprises at least one indicator associated with tilt direction and at least one indicator associated with rotation direction;

wherein the proactive aiming assistance guidance information indicates the amount of rotation to be provided in the rotation direction by selectively flashing the at least one indicator associated with rotation direction; and wherein the proactive aiming assistance guidance information indicates the amount of tilt to be provided by selectively flashing the at least one indicator associated with tilt direction.

13. The system of claim 11, wherein the at least one second storage medium further storing program instructions executable by the at least one processor for: receiving sensor information from the wireless node when orientation of the wireless node has changed.

14. The system of claim 11, wherein step (j)(v) is performed by activating a hold guidance output of the aiming assistance user interface of the wireless node.

15. The system of claim 11, wherein the wireless node assigns a preference hierarchy to candidate wireless nodes listed in the list of candidate wireless nodes after receiving the list of candidate wireless nodes and selects the first candidate wireless node according to the preference hierarchy.

16. The system of claim 15, wherein the preference hierarchy is assigned according to at least one of relative distance, topology, configuration of the candidate wireless nodes, and calculation of predicted link budget.

17. The system of claim 11, wherein the at least one second storage medium further storing program instructions executable by the at least one second processor for:

monitoring a wireless link established with the first candidate wireless node after performing step (i);

determining whether or not the current orientation is suitable; and wherein when the wireless node determines that the current orientation is not suitable, indicating at the aiming assistance user interface that reorientation of the wireless node should be performed.

18. The system of claim 17, wherein the at least one second storage medium further storing program instructions executable by the at least one second processor for: providing proactive aiming assistance guidance information for performing reorientation of the wireless node.

19. The system of claim 11, wherein the at least one second storage medium further storing program instructions executable by the at least one second processor for:

periodically determining whether one or more new candidate wireless nodes have been deployed; and when one or more new candidate wireless nodes have been deployed, providing proactive aiming assistance guidance information with respect to the one or more new candidate wireless nodes.

20. The system of claim 11, wherein the at least one first storage medium further storing program instructions executable by the at least one first processor for: utilizing the sensor information for determining positions of interferers in a wireless environment of the wireless node after performing step (a).

* * * * *